(12) United States Patent
Sugawara et al.

(10) Patent No.: US 7,782,370 B2
(45) Date of Patent: Aug. 24, 2010

(54) IMAGING UNIT (75) Inventors: Kanako Sugawara, Tokyo (JP);
Akifumi Tabata, Tokyo (JP)

(73) Assignee: Hoya Corporation, Tokyo (JP)

( * ) Notice: Subject to any disclaimer, the term of this patent is extended or adjusted under 35 U.S.C. 154(b) by 386 days.

(21) Appl. No.: 11/933,577

(22) Filed: Nov. 1, 2007

(65) Prior Publication Data

US 2008/0106631 A1    May 8, 2008

(30) Foreign Application Priority Data

Nov. 2, 2006    (JP)    ............... 2006-299367

(51) Int. Cl.
*H04N 5/235* (2006.01)
*H04N 9/083* (2006.01)

(52) U.S. Cl. .................... 348/230.1; 348/272

(58) Field of Classification Search ........ None
See application file for complete search history.

(56) References Cited

U.S. PATENT DOCUMENTS

| | | | |
|---|---|---|---|
| 6,124,888 A | 9/2000 | Terada et al. | |
| 6,992,706 B2 * | 1/2006 | Mabuchi et al. | 348/220.1 |
| 7,181,092 B2 * | 2/2007 | Tsukioka | 382/312 |
| 2007/0096011 A1 | 5/2007 | Sato et al. | |
| 2007/0196083 A1 | 8/2007 | Yamamoto et al. | |
| 2007/0196101 A1 | 8/2007 | Maeda | |

FOREIGN PATENT DOCUMENTS

| | | |
|---|---|---|
| JP | 9247689 | 9/1997 |
| JP | 2003333610 | 11/2003 |
| JP | 200415772 | 1/2004 |
| JP | 200641913 | 2/2006 |
| JP | 2006203438 | 8/2006 |

OTHER PUBLICATIONS

English language Abstract of JP 2003-333610.
English language Abstract of JP 2006-203438.
English language Abstract of JP 2006-41913.

* cited by examiner

*Primary Examiner*—Lin Ye
*Assistant Examiner*—Euel K Cowan
(74) *Attorney, Agent, or Firm*—Greenblum & Bernstein, P.L.C.

(57) ABSTRACT

According to the present invention, an imaging unit, comprising an imaging device, an imaging device driver, and a signal-processing block, is provided. The imaging device has pixels which are arranged in a first direction. The pixels are alternately and repeatedly covered with N1 kinds of different color filters along the first direction. The imaging device driver drives the imaging device. N1*N2 pixels successively arranged in the first direction are defined as a pixel block. The imaging device driver orders the N1 pixels covered with the different color filters in the pixel block to output pixel signals when a first output method with thinning out is carried out. The signal-processing block averages the pixel signals output from a plurality of the pixel blocks for every color of the color filter 3 Claims, 12 Drawing Sheets

PIXEL ARRANGEMENT

|   | 1 | 2 | 3 | 4 | 5 | 6 | 7 | 8 | 9 | 10 | 11 | 12 |
|---|---|---|---|---|---|---|---|---|---|----|----|----|
| 1 | R | G | R | G | R | G | R | G | R | G  | R  | G  |
| 2 | G | B | G | B | G | B | G | B | G | B  | G  | B  |
| 3 | R | G | R | G | R | G | R | G | R | G  | R  | G  |
| 4 | G | B | G | B | G | B | G | B | G | B  | G  | B  |
| 5 | R | G | R | G | R | G | R | G | R | G  | R  | G  |
| 6 | G | B | G | B | G | B | G | B | G | B  | G  | B  |
| 7 | R | G | R | G | R | G | R | G | R | G  | R  | G  |
| 8 | G | B | G | B | G | B | G | B | G | B  | G  | B  |
| 9 | R | G | R | G | R | G | R | G | R | G  | R  | G  |
| 10| G | B | G | B | G | B | G | B | G | B  | G  | B  |
| 11| R | G | R | G | R | G | R | G | R | G  | R  | G  |
| 12| G | B | G | B | G | B | G | B | G | B  | G  | B  |

26

THIRD OUTPUT METHOD WITH THINNING OUT

| R (1,1)  | G (1,4)  | R (1,7)  | G (1,10)  |
|----------|----------|----------|-----------|
| G (2,1)  | B (2,4)  | G (2,7)  | B (2,10)  |
| R (5,1)  | G (5,4)  | R (5,7)  | G (5,10)  |
| G (6,1)  | B (6,4)  | G (6,7)  | B (6,10)  |
| R (9,1)  | G (9,4)  | R (9,7)  | G (9,10)  |
| G (10,1) | B (10,4) | G (10,7) | B (10,10) |

IMAGING UNIT

BACKGROUND OF THE INVENTION

1. Field of the Invention

The present invention relates to an imaging unit that captures an optical image of a subject while maintaining a high frame rate and reducing the occurrence of moire.

2. Description of the Related Art

A digital camera which comprises an imaging device having a great number of pixels and which can shoot both static images and moving images is known. When a moving image is shot using such a digital camera, generally the pixels ordered to output a pixel signal are limited in a process known as "thinning out". Thus, in thinning out pixels, the pixel signal generated by a pixel (dependent on the amount of received light), is read and output from a subset of the pixels during the period for reading the pixel signals corresponding to an image.

By thinning out the pixels to output, the frame rate can be prevented from dropping. Consequently, the time it takes to read the pixel signals comprising an entire image can be shortened while the time it takes for a single pixel to generate and output a pixel signal is kept fixed. However, the problem arises that moire, (false pattern), occurs due to the loss a part of the complete image resulting from the thinning out of pixels.

In addressing for this problem, Japanese Patent Publication No. 2003-333610 discloses the generation of an image signal with a strength the same as that generated without thinning out by ordering all pixels to output pixel signals and performing a pixel mixing process on the output pixel signals. The pixel mixing process prevents moire from occurring. However, the time it takes to read the pixel signals comprising an entire image cannot be shortened because pixel signals should be output separately from all pixels in an imaging device.

SUMMARY OF THE INVENTION

Therefore, an object of the present invention is to provide an imaging unit that generates an image signal with reduced moire while maintaining a high frame rate.

According to the present invention, an imaging unit, comprising an imaging device, an imaging device driver, and a signal-processing block, is provided. The imaging device has pixels which are arranged in a first direction. The pixels are alternately and repeatedly covered with N1 kinds of different color filters along the first direction. N1 is an integer greater than or equal to two. The pixels generate pixel signals according to the amount of light passing through the color filters. The imaging device driver drives the imaging device. N1*N2 pixels successively arranged in the first direction are defined as a pixel block. N2 is a positive integer. The imaging device driver orders the N1 pixels covered with the different color filters in the pixel block to output the pixel signals when a first output method with thinning out is carried out. The pixel signals are output with thinning out in the first direction according to the first output method with thinning out. The signal-processing block averages the pixel signals output from a plurality of the pixel blocks for every color of the color filter.

Further, the pixels are arranged in a second direction. The second direction is perpendicular to the first direction. The pixels are alternately and repeatedly covered with N4 kinds of different color filters along the second direction. N4 is an integer over two. The imaging device driver orders the N1 pixels covered with the different color filters in the pixel block to output the pixel signals in the first direction and orders the pixels to output the pixel signals from every (N4*N5+1) pixels in the second direction when a second output method with thinning out is carried out. N5 is a positive integer. The pixel signals are output with thinning out in the first and second directions according to the second method with thinning out.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiment shown in the drawings.

Figure 1:
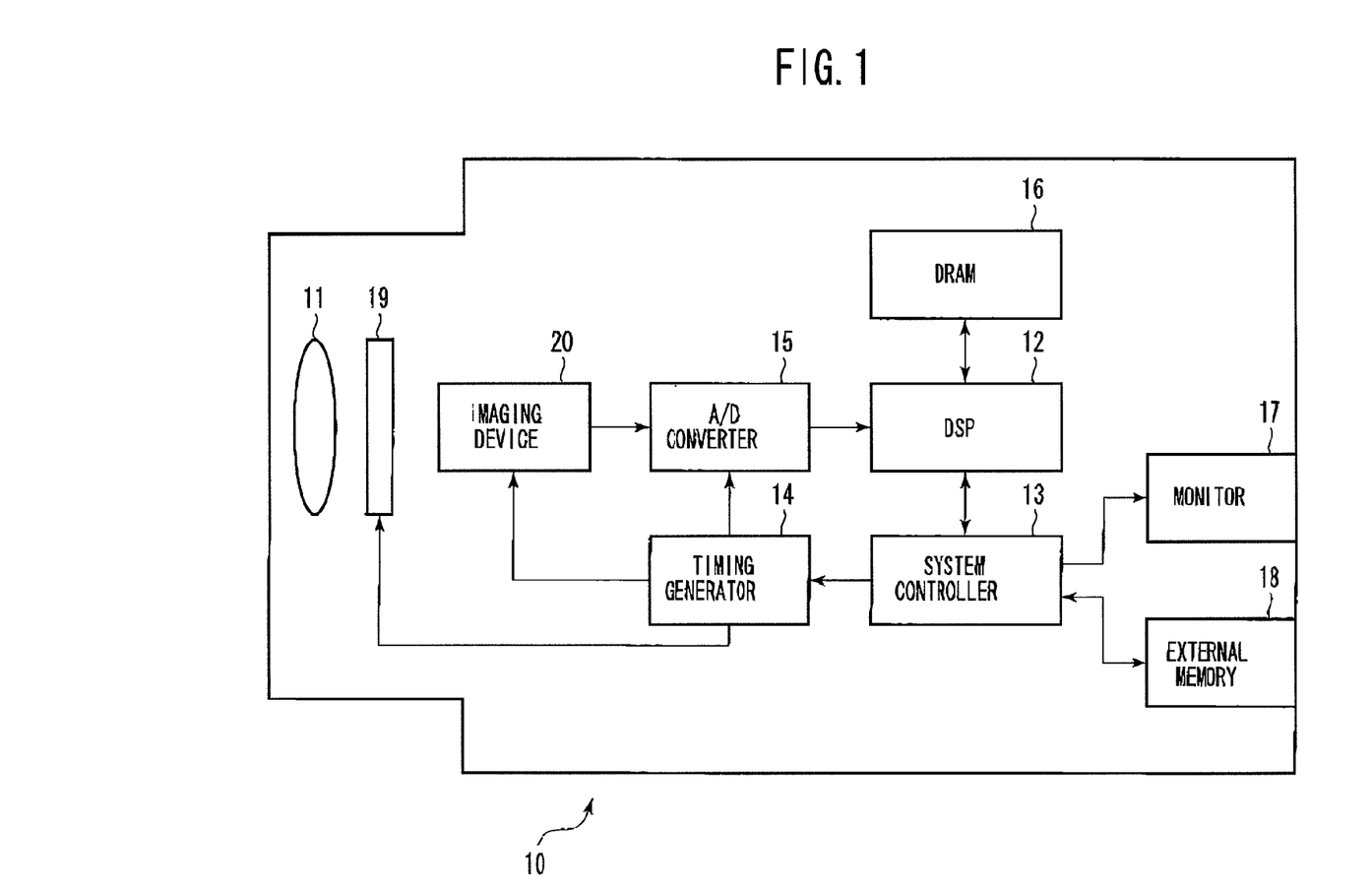
FIG. 1 is a block diagram showing the internal structure of a digital camera having an imaging unit of an embodiment of the present invention.

In FIG. 1, a digital camera 10 comprises a lens 11, an imaging device 20, a digital signal processor (DSP) 12 (signal-processing block), a system controller 13, a timing generator 14 (imaging device driver), and other components.

The lens 11 is optically connected to the imaging device 20. The optical image of a subject passing through the lens 11 reaches the light-receiving surface of the imaging device 20. When the imaging device 20 captures the optical image of the subject upon its light-receiving surface, the imaging device 20 generates an image signal corresponding to the captured optical image.

The analog image signal generated by the imaging device 20 is converted into a digital image signal by an A/D converter 15. The digital image signal is then sent to the DSP 12.

The image signal received by the DSP 12 is temporarily stored in a DRAM 16, which is used as a work memory. The DSP 12 carries out predetermined signal processing on the image signal stored in the DRAM 16.

The imaging device may generate an image signal according to a normal output method or an output method with thinning out, as described later. As signal-averaging process described later is carried out on an image signal generated according to the output method with thinning out, in addition to the predetermined signal processing performed on image signals generated according to the normal output method.

The image signal, having undergone the above signal processing, is sent to the monitor 17, where an image corresponding to the received image signal is displayed. Therefore, the image signal, having undergone the above signal proceeding, can be stored in an external memory 18 which is connected to the DSP 12 via a system controller 13 and a connector (not depicted).

Each component of the digital camera 10 is controlled by the system controller 13. The timing generator 14 drives the imaging device 20 and a shutter 19 so that an image signal is generated.

Figure 2:
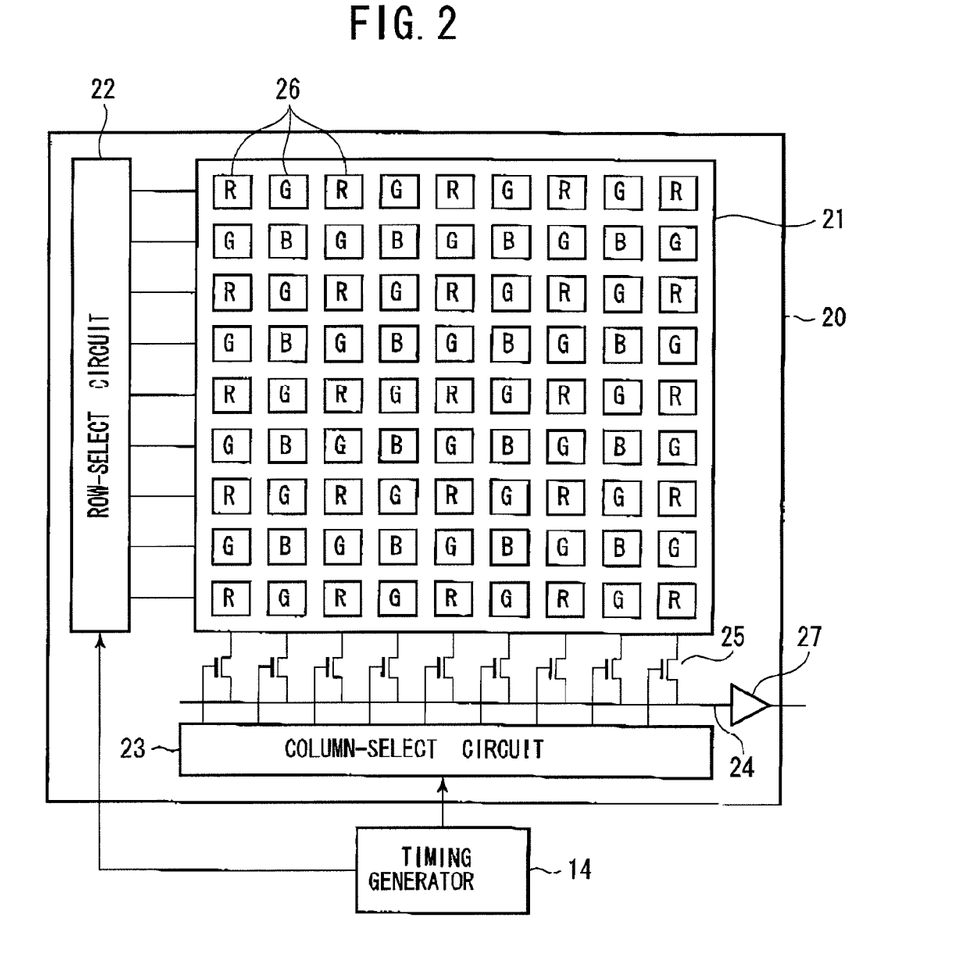
FIG. 2 is a block diagram showing the structure of the imaging device.

Next, the structure of the imaging device 20 is explained using FIG. 2. In the following description, the position of a pixel and a column pixel block (explained later) is ordered from top to bottom. In addition, the position of a pixel and a row pixel block (explained later) is ordered from left to right.

The imaging device 20 is a CMOS area sensor and comprises an imaging block 21, a row-select circuit 22, a column-select circuit 23, a horizontal output line 24, column-select transistors 25, and other components.

The imaging block 21 is directly connected to the row-select circuit 22. The horizontal output line 24 is connected to the imaging block 21 via the column-select transistor 25. The column-select circuit 23 is connected to the column-select transistor 25.

A plurality of pixels 26 are arranged in a matrix on the light-receiving surface of the imaging block 21. Each pixel 26 is covered with either a red, green, or blue color filter. The red, green, and blue color filters are arranged on the pixels in the matrix according to the Bayer color array.

Accordingly, the red and green color filters are alternately and repeatedly arranged within alternate rows. Likewise, the green and blue color filters are alternately and repeatedly arranged in the interleaved rows.

Consequently, the red and green color filters are alternately and repeatedly arranged within alternate columns. Likewise, the green and blue color filters are alternately and repeatedly arranged in the interleaved columns.

A red pixel 26, which is covered with a red color filter, generates a pixel signal according to the magnitude of the red light component received by the red pixel 26. A green pixel 26, which is covered with a green color filter, generates a pixel signal according to the magnitude of the green light component received by the green pixel 26. A blue pixel 26, which is covered with a blue color filter, generates a pixel signal according to the magnitude of the blue light component received by the blue pixel 26. The aggregate pixel signals generated during one frame period are output from the imaging device 20 as an image signal corresponding to an optical image of a subject.

The pixel signals generated by each pixel 26 are individually read out. The pixel 26 to be read out is selected directly by the row-select circuit 22 and indirectly by the column-select circuit 23.

The row-select circuit 22 selects a row where a plurality of pixels 26 to be read out are arranged. The pixel signals output from the pixels 26 in the selected row are transmitted to the column-select transistors 25. The column-select circuit 23 selects the column corresponding to a column-select transistor 25 to output the transmitted pixel signal. The pixel signal from the selected column-select transistor 25 is transmitted to an output block 27 via the horizontal output line 24, and then the output block 27 outputs the pixel signals to an external circuit.

The pixel signals output from the imaging device 20 are sent to the DSP 12 via the A/D converter 15. The DSP 12 carries out predetermined signal processing on the pixel signals. Finally, the aggregate pixel signals are sent as an image signal to the monitor 17 or the external memory 18.

The row- and column-select circuits 22 and 23 are connected to the timing generator 14. The timing generator 14 drives the row- and column-select circuits 22 and 23 so as to select the pixel to output a pixel signal.

The pixel signals are output from the imaging device 20 according to either the normal output method, or the first, second, third, or fourth output methods with thinning out. According to the normal output method, pixel signals are output from all pixels 26. According to the first output method with thinning out, pixel signals are output from a subset of the pixels in all columns. According to the second output method with thinning out, pixel signals are output from a subset of pixels in all rows. According to the third and fourth output methods with thinning out, pixel signals are output from a subset of the pixels in a subset or the columns and rows.

The normal output method is explained in detail below. In the normal output method, first, the row-select circuit 22 selects pixels 26 in the first row. When the pixels in the first row are selected, pixel signals can be output from all the selected pixels 26.

While the pixels 26 in the first row are selected, the column-select circuit 23 selects the first—ath column—(The ath column is the last column) select transistors 25 in sequential order in the row direction. The selected column-select transistor 25 is switched on, and it becomes conductive. By switching on column-select transistors 25 in order, pixel signals are sequentially output from each pixel in the first—ath columns of the first row.

When all pixel signals from the pixels in the first row are output, the row-select circuit 22 finishes the selection of the first row. Next, the row-select circuit 22 selects pixels 26 in the second row. Just as with the first row, the column-select circuit 23 selects each column-select transistor 25 in order, and then pixel signals are sequentially output from each pixel in the first —ath columns of the second row.

Just as with the first and second rows, the row-select circuit 22 selects each row from the third to the bth row in order (The bth row is an end row in the column direction). During each row-selection period, pixel signals are sequentially output from the pixels 26 in the first—ath columns of the remaining rows in order.

Figure 3:
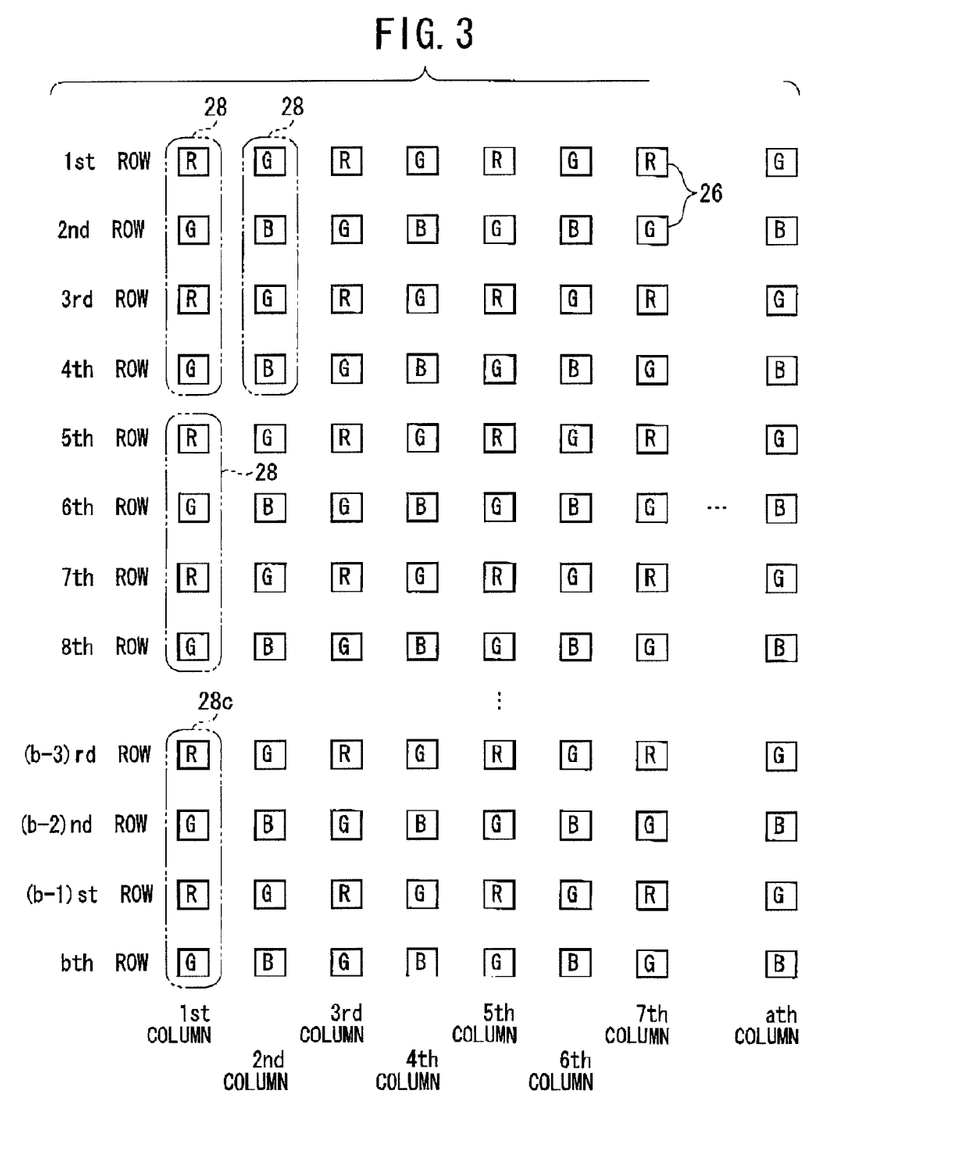
FIG. 3 is a diagram of the pixel arrangement on the light-receiving surface illustrating a column pixel block.

The first output method with thinning out is explained in detail below. As shown in FIG. 3, a group of four pixels successively arranged in the column direction is defined as a column pixel block 28. In the first output method with thinning out, pixel signals generated by the pixels in the first and second row in each column pixel block 28 are output. Accordingly, in the first output method with thinning out, pixel signals are output from half of pixels 26 along the column direction.

For example, in the first output method with thinning out, the row-select circuit 22 selects pixels 26 in the first row of the first column pixel block 28. In other words, the row-select circuit 22 selects pixels 26 in the first row of the entire imaging block 21. By selecting the pixels in the first row, pixel signals can be output from all the pixels 26 in the first row.

Just as with the normal output method, while the pixels 26 in the first row are selected, the column-select circuit 23 selects the first—ath column-select transistors 25 in order. Then, pixel signals generated by each pixel in the first—ath columns of the first row are output sequentially.

When all pixel signals generated by the pixels in the first row are output, the row-select circuit 22 finishes its selection of the first row. Next, the row-select circuit 22 selects pixels 26 in the second row of the first column pixel block 28. In other words, the row-select circuit 22 selects pixels 26 in the second row of the entire imaging block 21. Just as with the first row, the column-select circuit 23 selects each column-select transistor 25, and then pixel signals are output sequentially from each pixel in the first—ath columns of the second row.

Figure 4:
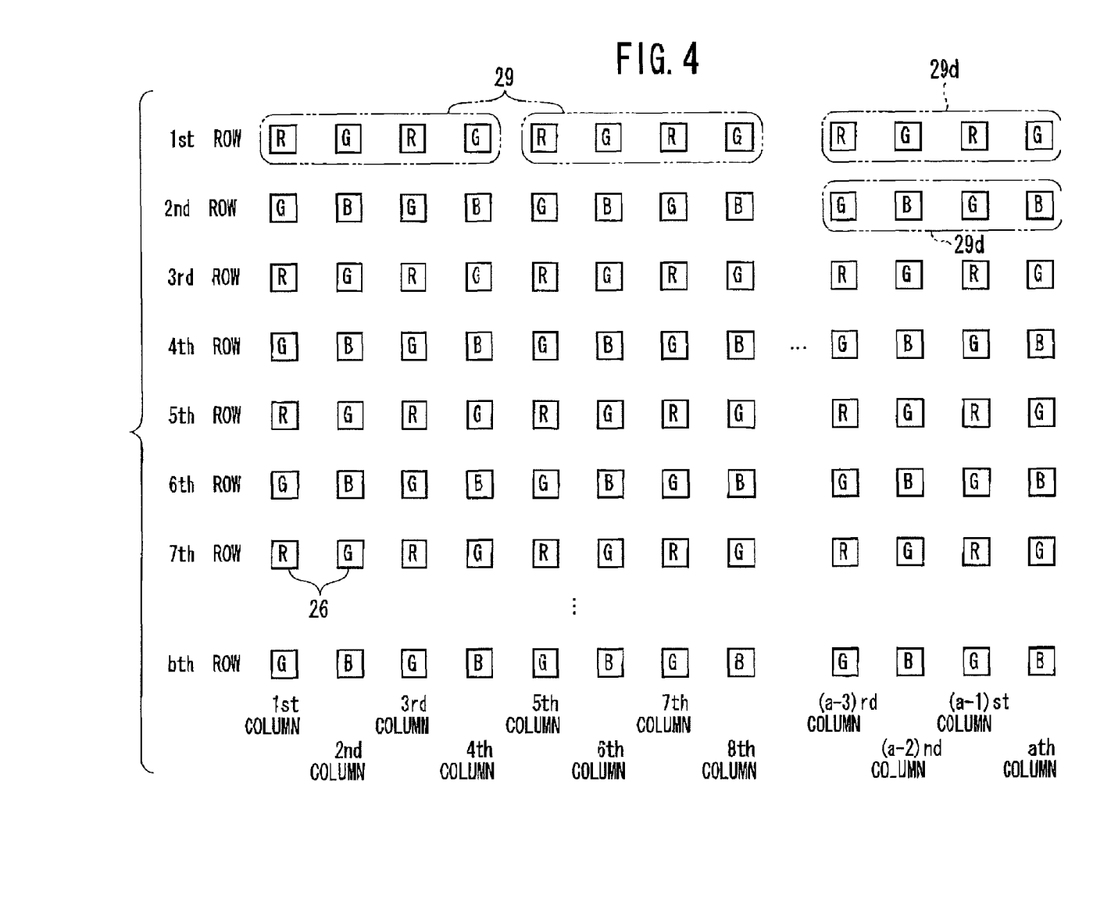
FIG. 4 is a diagram of the pixel arrangement on the light-receiving surface illustrating a row pixel block.

Just as with the first column pixel block 28, the row-select circuit 22 selects the first and second rows in each column pixel block 28 from the second to cth column pixel blocks 28 in order (The cth column pixel block 28c is the last column pixel block), The second output method with thinning out is explained in detail below. As shown in FIG. 4, a group of tour pixels successively arranged in the row direction is defined as a row pixel block 29. In the second output method with thinning out, pixel signals generated by the first and second pixels in each row pixel block 29 are output. Accordingly, in the second output method with thinning out, pixel signals are output from half of the pixels 26 along the row direction.

For example, in the second output method with thinning out, the row-select circuit 22 selects pixels 26 in the first row, and the pixel signals can be output from all pixels 26 in the first row. While the pixels 26 in the first row are selected, the outset circuit 23 selects the first column of the first row pixel block 29. In other words, the column-select circuit 23 selects pixels 26 in the first column in the entire imaging block 21. Then, the pixel signal generated by the pixel in the first row by the first column is output. Next, the column-select circuit 23 selects the second column of the first row pixel block 29. In other words, the column-select circuit 23 selects the second column in the entire imaging block 21.

While the pixels 26 in the first row are selected, the pixels in the first and second columns in each row pixel block 29 from the second to dth row pixel block 29d are selected in order, and then pixel signals generated by the selected pixel in the first row are output (The dth row pixel block 29d is the last row pixel block in the row direction).

When pixel signals generated by the pixels 26 in the first row are output, the row-select circuit 22 finishes its selection of the first row. Next, the row-select circuit 22 selects pixels 26 in the second row. Just as with the first row, the pixels in the first and second column in each row pixel block 29 from the first to dth row pixel block 29d in the second row are selected in order, and then pixel signals generated by the selected pixel 26 in the second row are output. As with the first and second row pixel block 29, half of the pixels in each row from the third row to the bth row ate selected, and the pixel signal generated by the selected pixels are output in order.

The third output method with thinning out is explained in detail below. In the third output method with thinning out, some pixels are thinned out in the row direction as well as in the column direction like the first output method with thinning out. The row-select circuit 22 selects pixels 26 in the first row of the first column pixel block 28, as in the first output method with thinning out. In other words, the row-select circuit 22 selects pixels 26 in the first row of the entire imaging block 21. By selecting the pixels in the first row, pixel signals can be output from all the pixels 26 in the first row.

Unlike the first output method with thinning out, while the pixels 26 in the first row are selected, one pixel is selected for pixel-signal read-out from every three pixels arranged in the row direction. For example, the column-select transistors 25 from the first to the (3*e−2)nd column are selected in order, a being a positive integer. Accordingly, pixel signals generated by the pixels 26 in the first—(3*e−2)nd column by the first row are output in order.

When the pixel signals generated by the selected pixels in the first row are output, the row-select circuit 22 finishes the selection of the first row. Next, the row-select circuit 22 selects pixels 26 in the second row of the first column pixel block 28, as in the first output method with thinning out. In other words, the row-select circuit 22 selects pixels 26 In the second row of the imaging block 21. As with the first row, pixel signals generated by the pixels 26 in the first—(3*e−2)nd column by the second row are output in order.

Just as with the first and second rows or the first column pixel block 28, pixel signals generated by the pixels in the first and second rows of each column pixel block 28 arranged in the first—(3*e−2)nd columns are output. Accordingly, by the third output method with thinning out, one third of the pixel signals in the row direction and half of the pixel signals in the column direction are selected.

The fourth output method with thinning out is explained in detail below. In the fourth output method with thinning out, some pixels are thinned out in the column direction as well as in the row direction, like the second output method with thinning out. The row-select circuit 22 selects pixels 26 in the first row as in the second output method with thinning out, and then pixel signals can be output from all the pixels 26 in the first row.

Like the second output method with thinning out, the pixel signals generated by the pixels in the first and second column of the first row pixel block 29 are output. Unlike the second output method with thinning out, one row is selected to output pixel signals every three rows. For example, after the output of the first row, the fourth—(3*f−2)nd rows are selected in order, f being a positive integer. Pixel signals generated by the pixels 26 in the first and second rows of the row pixel blocks 29 in the selected rows are output in order, as in the first row. In this manner, by the fourth output method with thinning out, one third of the pixel signals in the column direction and half of the pixel signals in the row direction are selected.

Next, the signal-averaging process is explained below. The signal-averaging process is performed by the DSP 12, when the pixel signals are output from the imaging device 20 according to the first, second, third, or fourth output methods with thinning out. There are various versions of signal-averaging processes. To the first output method with thinning out, a first or second signal-averaging process may be applied. To the second output method with thinning out, a third or fourth signal-averaging process may be applied. To the third output method with thinning out, a first or second is signal-averaging process may be applied. To the fourth output method with thinning out, a third or fourth signal-averaging process may be applied. In all the signal-averaging processes, two pixel signals of the same color component are averaged, and than an averaged pixel signal is generated. Incidentally, hereinafter a pixel signal generated by a red, green, or blue pixel arranged in the mth row by the nth column are referred to as R(m,n) G(m,n), and E(m,n), respectively, m and n being positive integers. In addition, hereinafter an averaged pixel signal, corresponding to a red, green, or blue pixel in the mth row by the nth column on the matrix, after carrying out the signal-averaging process are referred to as R' (m,n), G' (m,n), and B' (m,n), respectively.

The first and second signal-averaging process for pixel signals output according to the first output method with thinning out is explained below using FIGS. 5 and 6.

Figure 5:
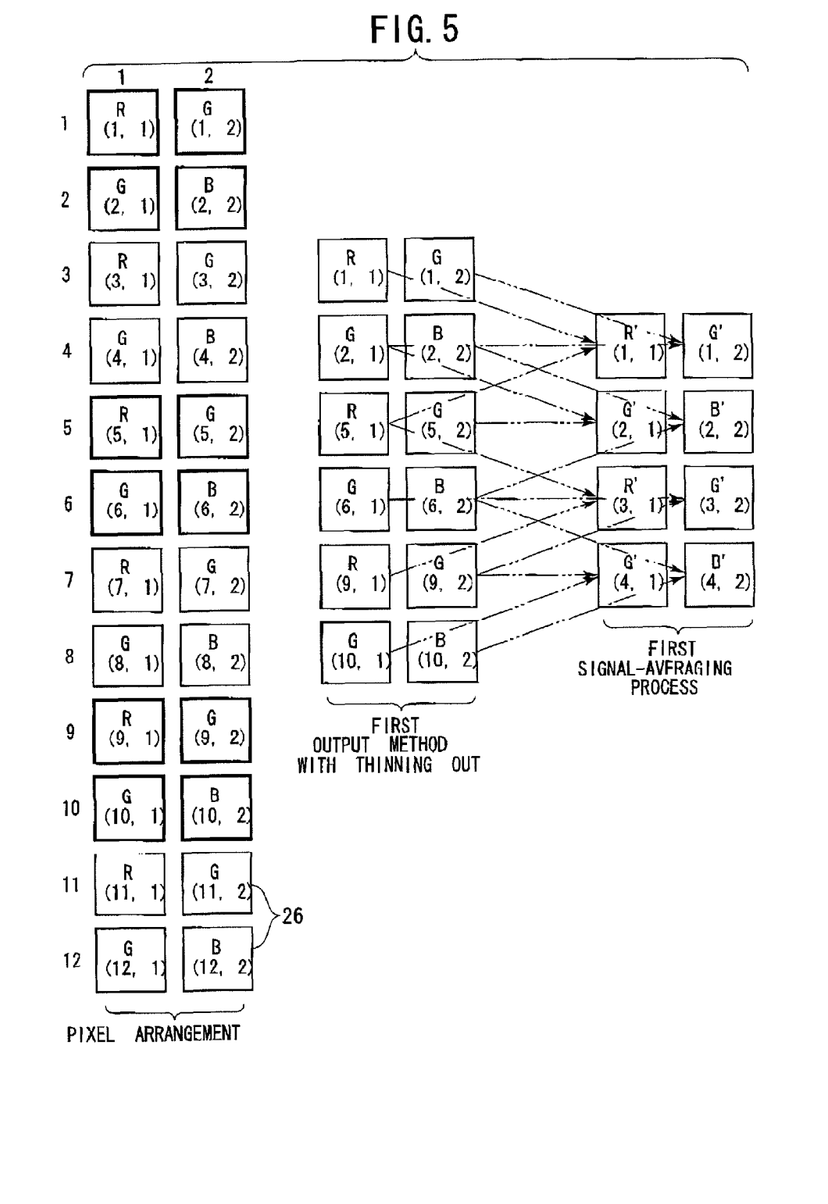
FIG. 5 is a diagram of a pixel arrangement illustrating the pixel signals which are output according to the first output method with thinning out, and undergo the first signal-averaging process.
Figure 6:
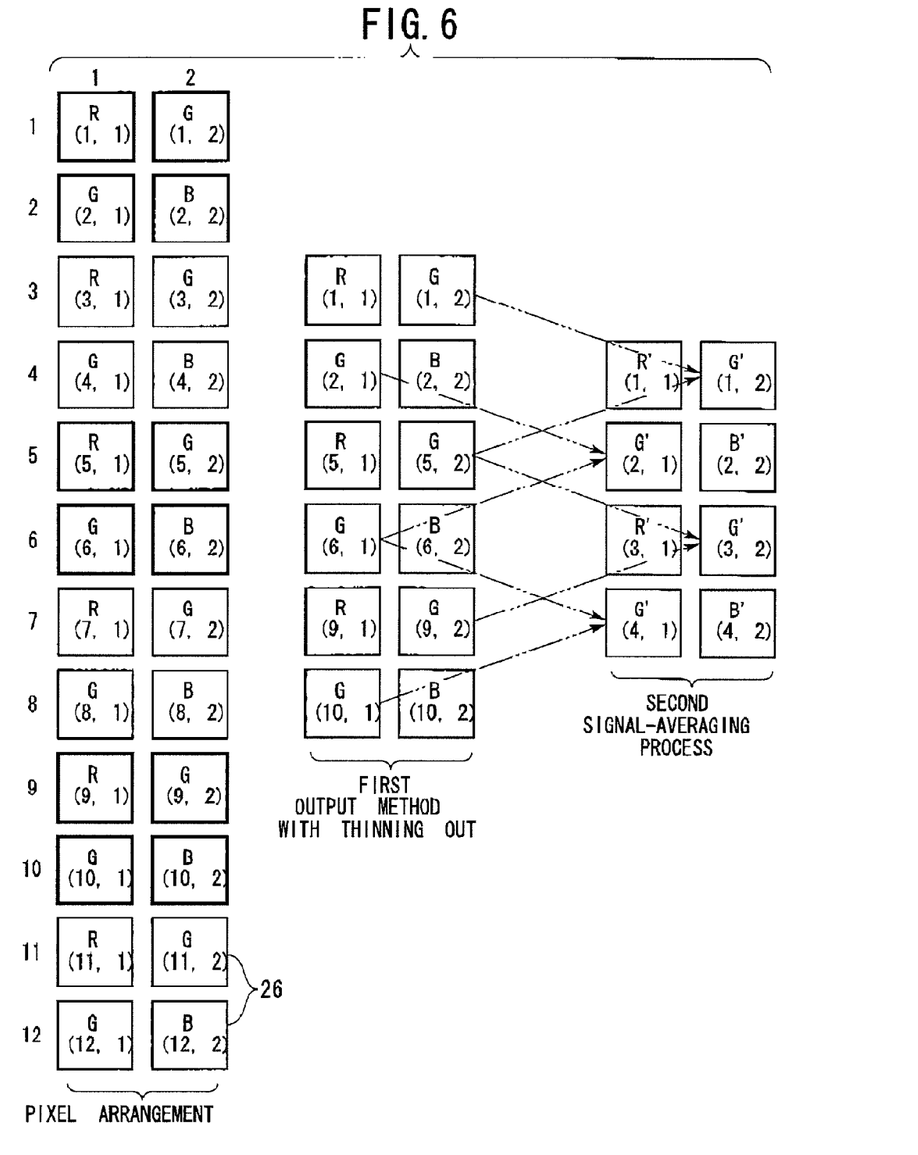
FIG. 6 is a diagram of a pixel arrangement illustrating the pixel signals which are output according to the first output method with thinning out, and undergo the second signal-averaging process.

At the left of FIGS. 5 and 6, twenty-four pixels 26 arranged on the imaging device 20 in twelve rows by two columns are shown. As described above, R(1,1), G(1,2), G(2,1), B(2,2), R(5,1), G(5,2), G(6,1), B(6,2), R(9,1), G(9,2), G(10,1), and B(10,2) are output in the first output method with thinning out (see FIGS. 5 and 6).

As for the red and blue pixels 26, two output pixel signals corresponding to two pixels 26 nearest to each other in the column direction are averaged, and then an averaged pixel signal corresponding to red or blue is generated. For example, by averaging R(1,1) and R(5,1), R (1,1) is generated (see the right side of FIG. 5). Similarly, by averaging R(5,1) and R(9,1), R' (3,1) is generated. Similarly, by averaging B(2,2) and B(6,2), B' (2,2) is generated. Similarly, by averaging B(6,2) and B(10,2), B' (4,2) is generated.

Incidentally, as for the green pixel 26, the procedure for averaging two pixel signals differs between the first and second signal-averaging processes.

In the first signal-averaging process, two output pixel signals corresponding to two obliquely arranged pixels 26 are averaged, and then an averaged pixel signal corresponding to green is generated. For example, by averaging G(1,2) and G(2,1), G' (1,2) is generated (see the right side of FIG. 5). Similarly, by averaging G(2,1) and G(5,2), G' (2,1) is generated. Similarly, by averaging G(6,1) and G(9,2), G' (3,2) is generated. Similarly, by averaging G(9,2) and G(10,1), G' (4,1) is generated.

In the second signal-averaging process, two output pixel signals corresponding to two pixels 26 nearest to each other in the column direction are averaged, and then an averaged pixel signal corresponding to green is generated, just as with to the red and blue pixels. For example, by averaging G(1,2) and G(5,2), G' (1,2) is generated (see the right side of FIG. 6). Similarly, by averaging G(2,1) and G(6,1), G' (2,1) is generated. Similarly, by averaging G(5,2) and G(9,2), G' (3,2) is generated. Similarly, by averaging C(G,1) and G(10,1), G' (4,1) is generated.

The third and fourth signal-averaging processes for pixel signals output according to the second output method with thinning out is explained below using the diagrams in of FIGS. 7 and 8.

Figure 7:
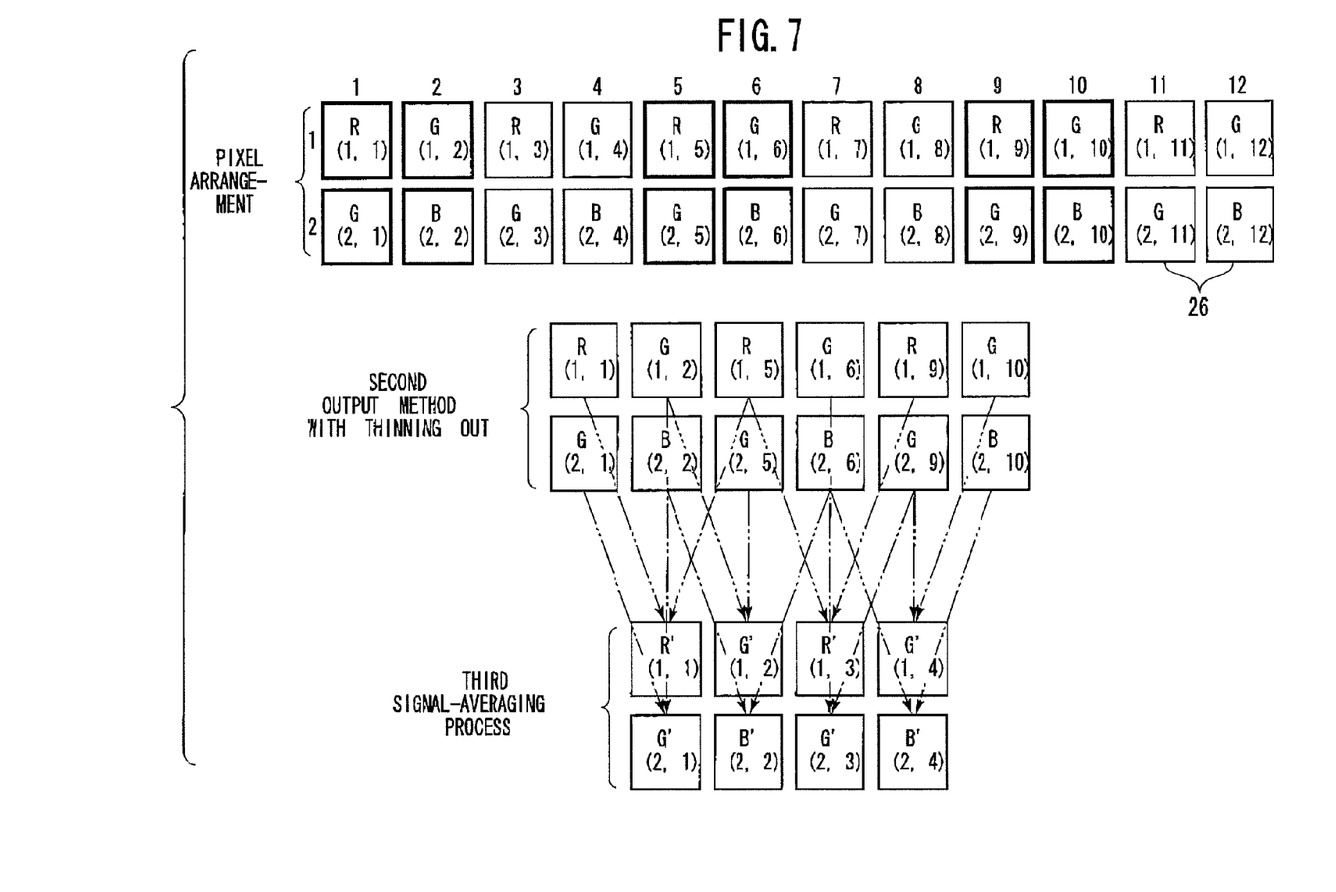
FIG. 7 is a diagram of a pixel arrangement illustrating the pixel signals which are output according to the second output method with thinning out, and undergo the third signal-averaging process.
Figure 8:
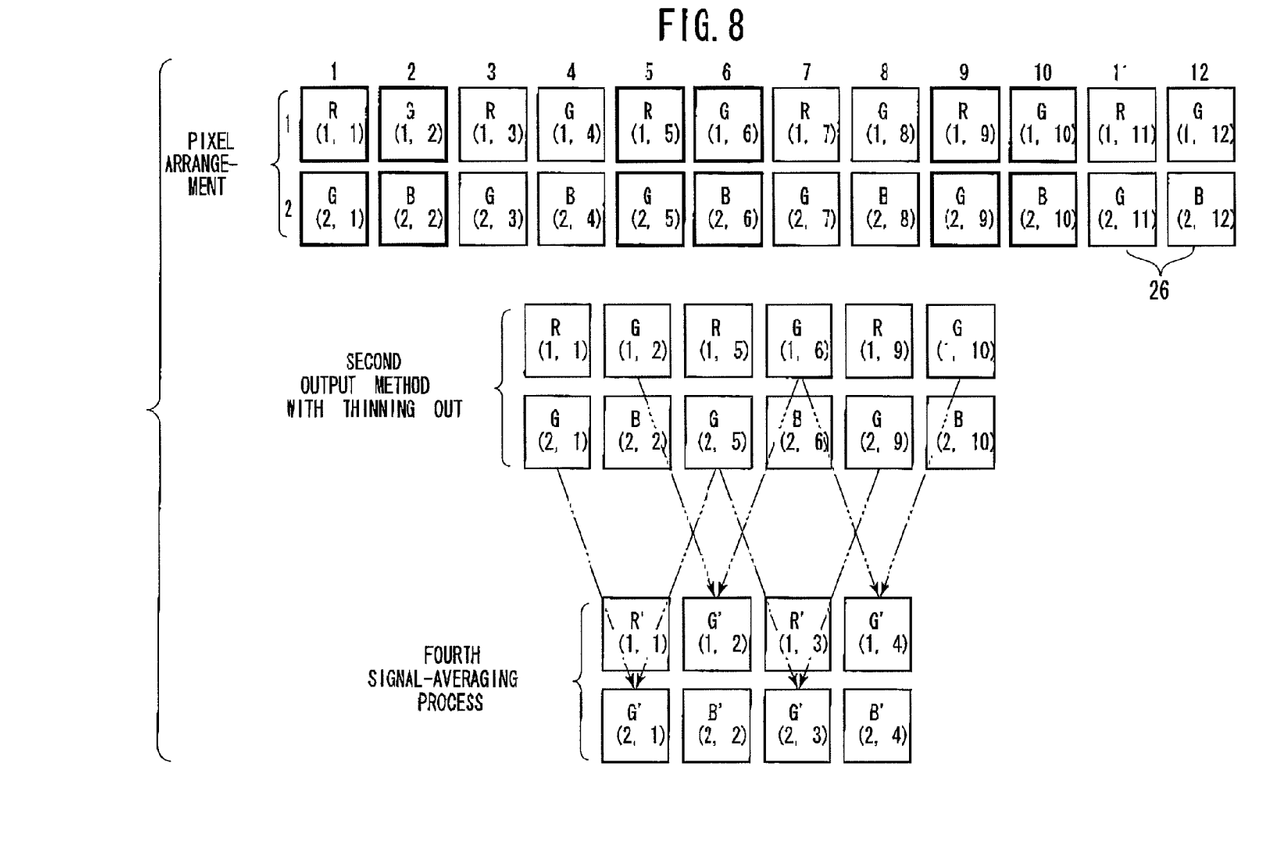
FIG. 8 is a diagram of a pixel arrangement illustrating the pixel signals which are output according to the second output method with thinning out, and undergo the fourth signal-averaging process.

At the top of FIGS. 7 and 8, twenty-four pixels 26 arranged on the imaging device 20 in two rows by twelve columns are shown. As described above, R(1,1), G(2,1), G(1,2), B(2,2), R(1,5), G(2,5), G(1,6), B(2,6), R(1,9), G (2,9), G (1,10), and B (2,10) are output in the second output method with thinning out (see FIGS. 7 and 8).

As for the red and blue pixels 26, two output pixel signals corresponding to two pixels 26 nearest to each other in the row direction are averaged, and then an averaged pixel signal corresponding to red or blue is generated. For example, by averaging R(1,1) and R(1,5), R' (1,1) is generated (see the bottom of FIG. 5) Similarly, by averaging R(1,5) and R(1,9), R' (1,3) is generated. Similarly, by averaging B(2,2) and B(2,6), B' (2,2) is generated, Similarly, by averaging B(2,6) and B(2,10), B' (2,4) is generated.

Incidentally, as for the green pixel 26, the procedure for averaging two pixel signals differs between the third and fourth signal-averaging processes.

In the third signal-averaging process, two output pixel signals corresponding to two obliquely arranged pixels 26 are averaged, and then an averaged pixel signal corresponding to green is generated. For example, by averaging G(2,1) and G(1,2), G' (2,1) is generated (see the bottom of FIG. 7). Similarly, by averaging G(1,2) and G(2,5), G' (1,2) is generated. Similarly, by averaging G(1,6) and G(2,9), G' (2,3) is generated. Similarly, by averaging G(2,90) and G(1,10), G' (1,4) is generated.

In the fourth signal-averaging process, two output pixel signals corresponding to two pixels 26 nearest to each other in the row direction are averaged, and then an averaged pixel signal corresponding to green is generated, similar to the red and blue pixels. For example, by averaging G(2,1) and G(2, 5), G' (2,1) is generated (see the bottom of FIG. 8). Similarly, by averaging G(1,2) and G(1,6), G' (1,2) is generated. Similarly, by averaging G(2,5) and G(2,9), G' (2,3) is generated. Similarly, by averaging G(1,6) and G(1,10), G' (1,4) is generated.

The first signal-averaging process for pixel signals output according to the third output method with thinning out is explained below using the diagrams of FIGS. 9 and 10.

Figure 9:
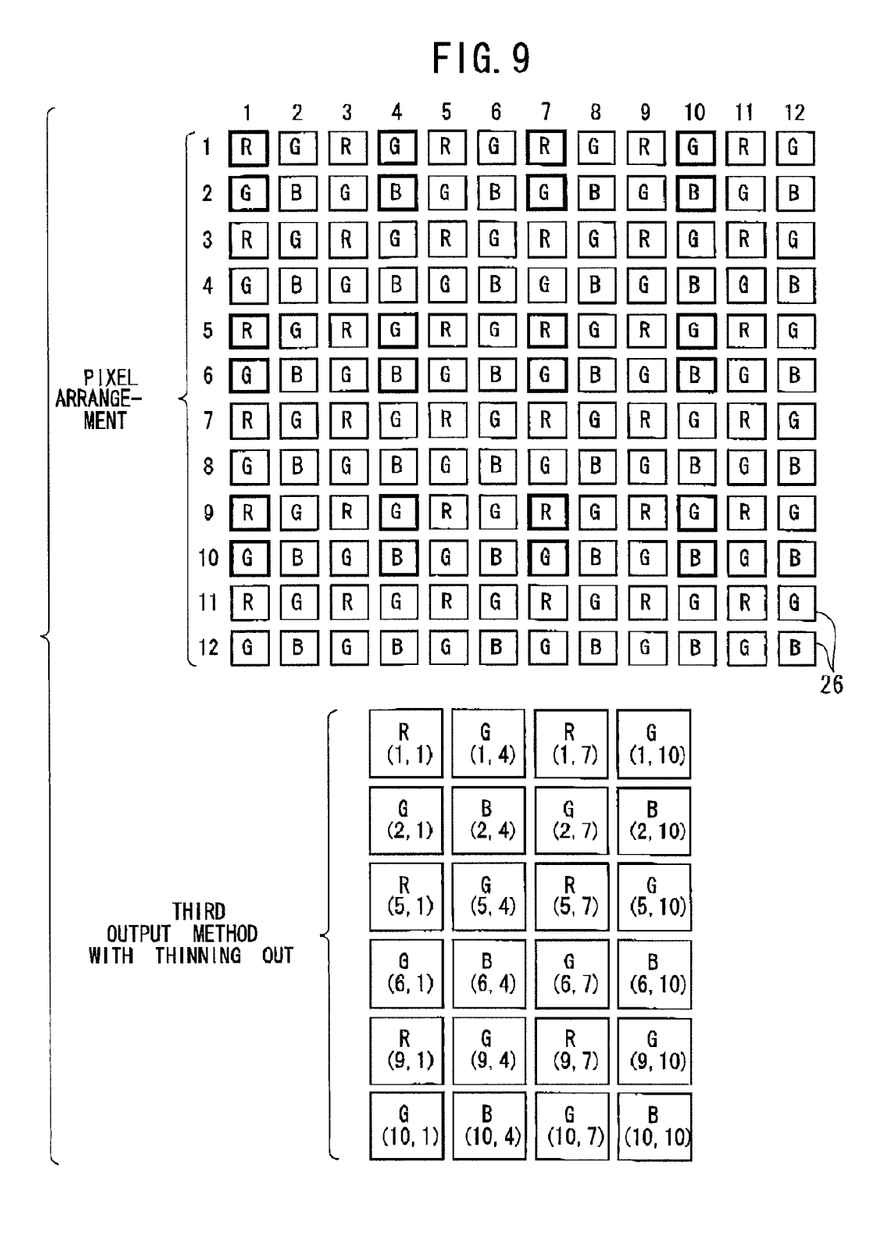
FIG. 9 is a first diagram of a pixel arrangement illustrating the pixel signals which are output according to the third output method with thinning out, and undergo the first signal-averaging process.
Figure 10:
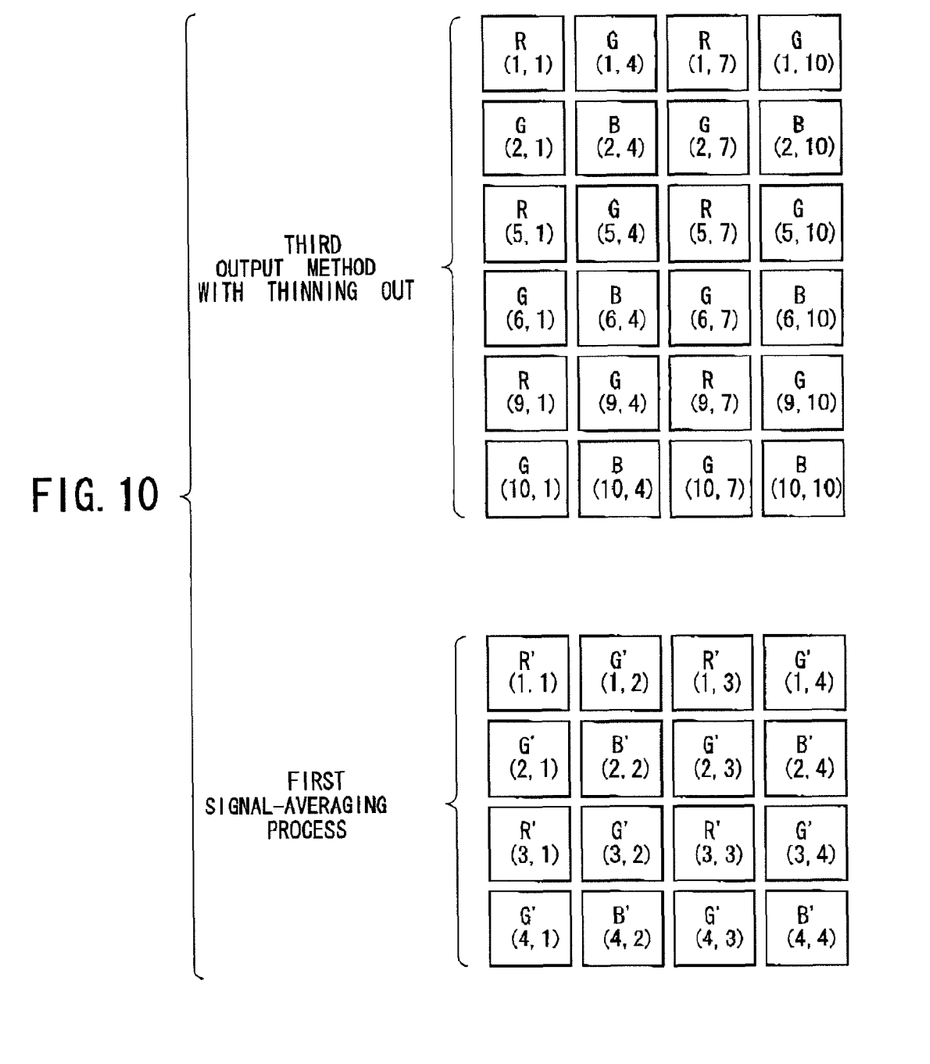
FIG. 10 is a second diagram of a pixel arrangement illustrating the pixel signals which are output according to the third output method with thinning out, and undergo the first signal-averaging process.

At the top of FIG. 9, one hundred forty-four pixels 26 arranged on the imaging device 20 in twelve rows by twelve columns are shown. As described above, R(1,1), G(1,4), R(1, 7), G(1,10), G(2,1), B(2,4), C(2,7), B(2,10), R(5,1) G(5,4), R(5,7), G(5,10), G(6,1), B(6,4), G(6,7), B(6,10), R(9,1), G(9, 4), R(9,7), G(9,10), G(10,1), B(10,4), G(10,7), and B(10,10) are output in the third output method with thinning out (see FIG. 9).

As for the red and blue pixels 26, two output pixel signals corresponding to the two pixels 26 nearest to each other in the column direction are averaged, and then an averaged pixel signal corresponding to red or blue is generated. For example, by averaging R(1,1) and R(5,1), R' (1,1) is generated (see the bottom of FIG. 10). Similarly, by averaging R(5,1) and R(9, 1), R' (3,1) is generated. Similarly, by averaging R(1,7) and R(5,7), R' (1,3) is generated. Similarly, by averaging R(5,7) and R(9,7), R' (3,3) is generated. Similarly, by averaging B(2,4) and B(6,4), B' (2,2) is generated. Similarly, by averaging B(6,4) and B(10,4), B' (4,2) is generated. Similarly, by averaging B(2,10) and B(6,10), B' (2,4) is generated. Similarly, by averaging B(6,10) and B(10,10), B' (4,4) is generated.

As for the green pixel 26, two output pixel signals corresponding to two obliquely arranged pixels 26 are averaged, and then an averaged pixel signal corresponding to green is generated. For example, by averaging G(1,4) and G(2,1), G' (1,2) is generated (see the bottom of FIG. 10). Similarly, by averaging G(2,1) and G(5,4), G' (2,1) is generated. Similarly, by averaging G(6,1) and G(9,4), G' (3,2) is generated. Similarly, by averaging G(9,4) and G(10,1), G' (1,3) is generated. Similarly, by averaging G(1,10) and G(2,7), G' (1,4) is generated. Similarly, by averaging G(2,7) and G(5,10), G' (2,3) is generated. Similarly, by averaging G(6,7) and G(9,10), G' (3,4) is generated. Similarly, by averaging G(9,10) and G(10, 7), G' (4,3) is generated.

Incidentally, the pixel signals output from the imaging device 20 according to the third output method with thinning out may undergo the second signal-averaging process, as in the first thinning-out output processing.

The third signal-averaging process for pixel signals output according to the fourth output method with thinning out is explained below using the diagrams of FIGS. 11 and 12.

Figure 11:
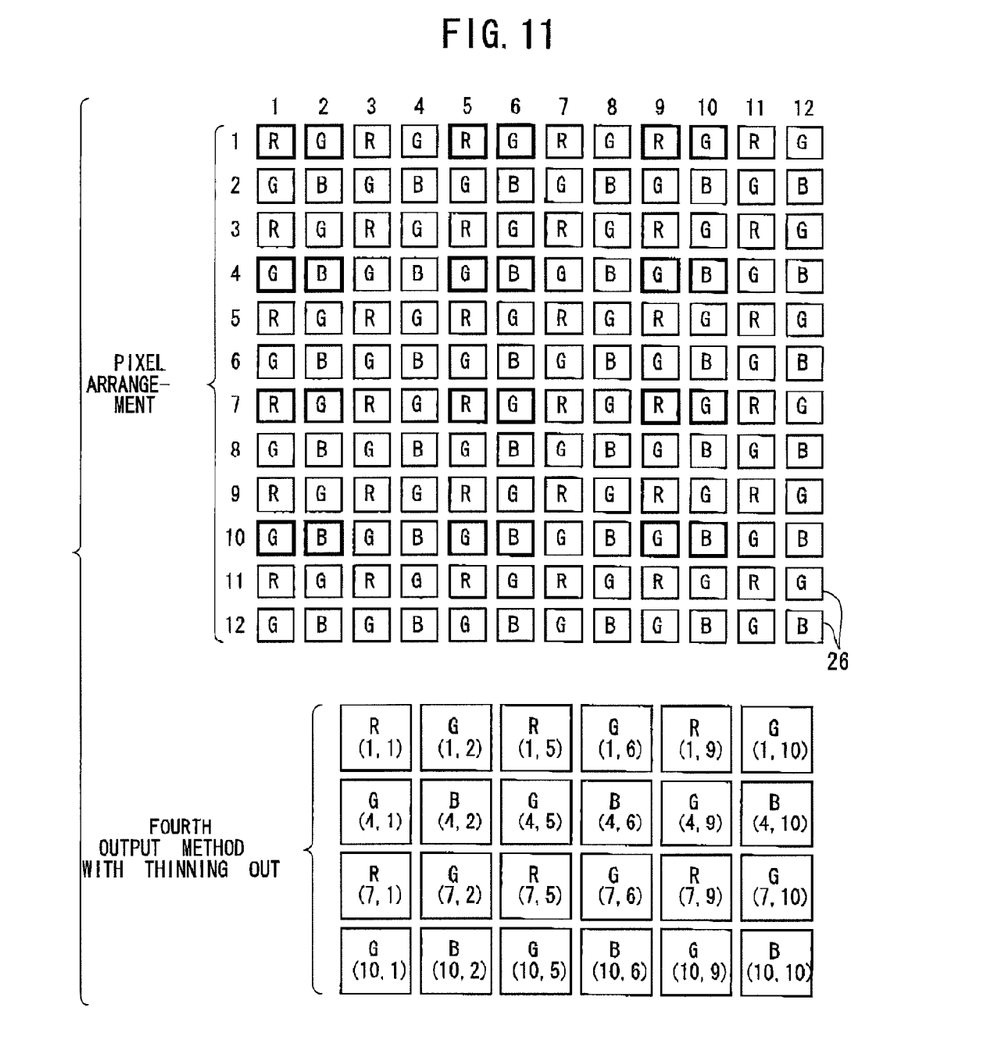
FIG. 11 is a first diagram of a pixel arrangement illustrating the pixel signals which are output according to the fourth output method with thinning out, and undergo the third signal-averaging process.
Figure 12:
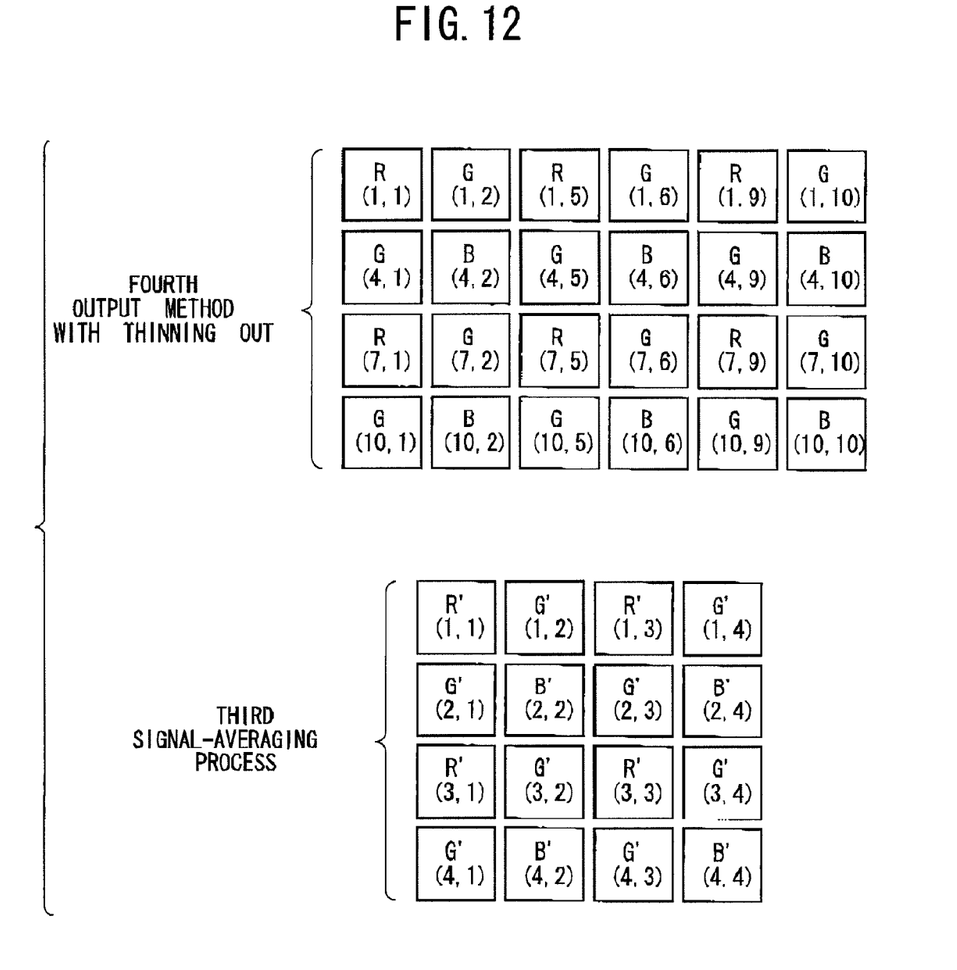
FIG. 12 is a second diagram of a pixel arrangement illustrating the pixel signals which are output according to the fourth output method with thinning out, and undergo the third signal-averaging process.

At the top of FIG. 11, one hundred forty-four pixels 26 arranged on the imaging device 20 in twelve rows by twelve columns are shown. As described above, R(1,1), G(1,2), R(1, 5), G(1,6), R(1,9), G(1,10), G(4,1), B(4,2), G(4,5), B(4,6), G(4,9), B(4,10), R(7,1), G(7,2), R(7,5), G(7,6), R(7,9), G(7, 10), G(10,1), B(10,2), G(10,5), B(10,6), G(10,9), and B(10, 10) are output in the fourth output method with thinning out (see FIG. 11).

As for the red and blue pixels 26, two output pixel signals corresponding to two pixels 26 nearest to each other in the row direction are averaged, and then an averaged pixel signal corresponding to red or blue is generated. For example, by averaging R(1,1) and R(1,5), R' (1,1) is generated (see the bottom of FIG. 12). Similarly, by averaging R(1,5) and R(1, 9), R'(1,3) is generated, Similarly, by averaging R(7,1) and R(7,5), R' (3,1) is generated. Similarly, by averaging R(7,5) and R(7,9), R' (3,3) is generated. Similarly, by averaging B(4,2) and B(4,6), B' (2,2) is generated. Similarly, by averaging B(4,6) and 13(4,10), B' (2,4) is generated. Similarly, by averaging B(10,2) and B(10,6), B' (4,2) is generated. Similarly, by averaging B(10,6) and B(10,10), B' (4,4) is generated.

As for the green pixel 26, two output pixel signals corresponding to two obliquely arranged pixels 26 are averaged, and then an averaged pixel signal corresponding to green is generated. For example, by averaging G(4,1) and G(1,2), G' (2,1) is generated (see the bottom of FIG. 12). Similarly, by averaging G(1,2) and G(4,5), G' (1,2) is generated. Similarly, by averaging G(1,6) and G(4,9), G' (2,3) is generated. Similarly, by averaging G(4,9) and G(1,10), G' (1,4) is generated. Similarly, by averaging G(10,1) and G(7,2), G' (4,1) is generated. Similarly, by averaging G(7,2) and G(10,5), G' (3,2) is generated. Similarly, by averaging G(7,6) and G(10,9), G' (4,3) is generated. Similarly, by averaging G(10,9) and G(7, 10), G' (3,4) is generated.

Incidentally, the pixel signals output from the imaging device 20 according to the fourth output method with thinning out may undergo the fourth signal-averaging process, as in the second thinning-out output processing.

In the above embodiment, a subset of pixels 26 can be thinned out for the output of a pixel signal. Consequently, the output period for one frame of a pixel signal can be shortened.

In addition, the appearance of moire can be reduced. In a prior output method with thinning out, the number of pixels read out equaled the desired number or picture-elements in an image. For example, if the desired number of picture-elements were ⅓ of the number of the pixels in the imaging device, ⅓ of pixels in the imaging device were read out. Therefore, ⅔ of the pixel signals in the imaging device were not used. That resulted in an increased appearance of moire. In contrast, the appearance of moire would decrease in the above embodiment because more pixels than the desired number of picture-elements would be read out, and the signal-averaging process would be carried out on the output pixel signals so that the number of averaged pixel signals matched the desired number.

In addition, in the above third and fourth output methods with thinning out, pixel signals in either row or column directions are output with thinning out and undergo the signal-averaging process, and pixel signals in the other direction are output every three pixels regardless the overlying color filter. Accordingly, the frame period can be shortened further than in the first and second output methods with thinning out. In addition, the appearance of moire is lowered compared to other output methods with thinning out because the space between the pixels which output their pixel signals in the other direction is fixed.

In the above embodiment, at least one of the four kinds of output methods with thinning out may be carried out, However, alternate embodiments may be implemented in which a specific, fixed number of output methods with thinning out are performed.

Three kinds of color filters are arranged according to the Bayer color array in the above embodiment. However, other color arrays may be implemented. Furthermore, even if the color filters are arranged so that the numbers filter colors differs in the column and row directions, (as in, for example, a complementary color filter), the same effect as in the above embodiment can be achieved.

In the above embodiment, the pixels 26 are covered with two kinds of color filters alternately and repeatedly in the row and column directions. However, the pixels 26 may be covered with N1 kinds of color filters at least in the row or column direction, N1 being an integer greater than two. Furthermore, the pixels 26 may be covered with N1 kinds of color filters either in the row or column direction and N4 kinds of color filters in the other direction, N4 being an integer greater than two and, possibly equaling N1. To generate an image to display similar to a captured optical image while carrying out the signal-averaging process, N1 kinds of pixel signals generated by the pixels of different color filters in the column or row pixel blocks 28 or 29 should be output. In addition, if pixel signals both in the row and column directions are thinned out and the signal-averaging process is performed on pixel signals either in the row or column direction as in the third or fourth output method with thinning out, then the pixel signals should be output from every (N4*N5+1) pixels in order to alternately and repeatedly output pixel signals of different colors at specific intervals in the row or column direction, N5 being a positive integer.

In the above embodiment, the number of pixels included in a single column or row pixel block 28 or 29 is four. However, the number may be over 2*N2, N2 being a positive integer. In addition, if N1 kinds of color filters are used in the row or column direction, pixels over N1*N2 should be included in the column or row pixel block 28 or 29.

In the above embodiment, two pixel signals which are output from two column pixel blocks neighboring in the column direction or from two row pixel blocks neighboring each other in the row direction are averaged. However, N3 pixel signals which are output from N3 column pixel blocks successively arranged in the column direction or from N3 row pixel blocks successively arranged in the row direction may be averaged instead, N3 being an integer greater than two.

In the above embodiment, the imaging device is a CMOS imaging device, but the present invention may be adapted to any other imaging device, such as a CCD imaging device.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2006-299367 (filed on Nov. 2, 2006), which is expressly incorporated herein, by reference, in its entirety.

The invention claimed is:

1. An imaging unit, comprising:

an imaging device that has pixels, said pixels being arranged in a first direction, said pixels being alternately and repeatedly covered with N1 kinds of different color filters along said first direction, N1 being an integer greater than or equal to two, and said pixels generating pixel signals according to the amount of light passing through said color filters;

an imaging device driver that drives said imaging device, with N1*N2 pixels successively arranged in said first direction being defined as a pixel block, N2 being a positive integer, and said imaging device driver ordering N1 pixels covered with said different color filters in said pixel block to output said pixel signals when a first output method with thinning out is carried out, said pixel signals being output with thinning out in said first direction according to said first output method with thinning out; and a signal-processing block that averages said pixel signal output from a plurality of said pixel blocks for every color of said color filter, wherein said pixels are arranged in a second direction, said second direction being perpendicular to said first direction, said pixels being alternately and repeatedly covered with N4 kinds of different color filters along said second direction, N4 being an integer greater than two, and said imaging device driver orders said N1 pixels covered with said different color filters in said pixel block to output said pixel signals in said first direction and orders said pixels to output said pixel signals from every (N4*N5+1) pixels in said second direction when a second output method with thinning out is carried out, N5 being a positive integer, said pixel signals being output with thinning out in said first and second directions according to said second output method with thinning out.

2. An imaging unit according to claim 1, wherein said signal-processing block averages said pixel signal output from N3 of said pixel blocks successively arranged in said first direction for every color of said color filter, and N3 is an integer greater than two.

3. An imaging unit according to claim 1, wherein only a first color filter is arranged on said pixels according to a checkered pattern, said signal-processing block averaging said pixel signals output from said pixel covered with said first color filter in a first pixel block and in a second pixel block, said second pixel block being oblique to said first pixel block.

* * * * *